G. D. MUNSING.
EGG BEATER.
APPLICATION FILED OCT. 20, 1920.

1,400,309.

Patented Dec. 13, 1921.

Inventor:
George D. Munsing
By Frederick V. Winter
Attorney.

UNITED STATES PATENT OFFICE.

GEORGE D. MUNSING, OF NEW YORK, N. Y.

EGG-BEATER.

1,400,309.  Specification of Letters Patent.  Patented Dec. 13, 1921.

Application filed October 20, 1920. Serial No. 418,238.

*To all whom it may concern:*

Be it known that I, GEORGE D. MUNSING, a citizen of the United States, residing at New York, in the county and State of New York, have invented certain new and useful Improvements in Egg-Beaters, of which the following is a full, clear, and exact specification.

This invention relates to egg beaters, and has for its object to provide a simple, inexpensive and efficient kitchen implement for beating or whipping eggs, cream and the like.

The present invention is of the piston type of suction egg beater, and one of the special objects is to provide a simple and cheap form of handle by means of which the device may be held in proper position during operation. Another object is to simplify and improve the suction casing in which the piston works and provide for the removal of said piston from said casing to permit ready cleaning of the device. Other objects will appear as the description proceeds.

The invention will be first hereinafter described in connection with the accompanying drawings, which constitute part of this specification, and then more specifically defined in the claim at the end of the description.

In the accompanying drawings, wherein similar reference characters are used to designate corresponding parts throughout the several views:—

Figure 1:
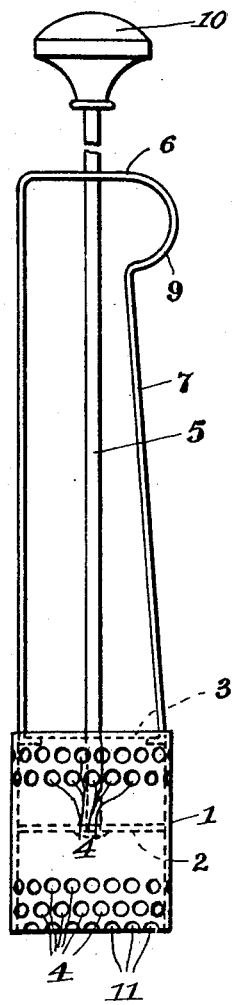
Figure 1 is an elevation of an egg beater made substantially in accordance with the present invention.
Figure 2:
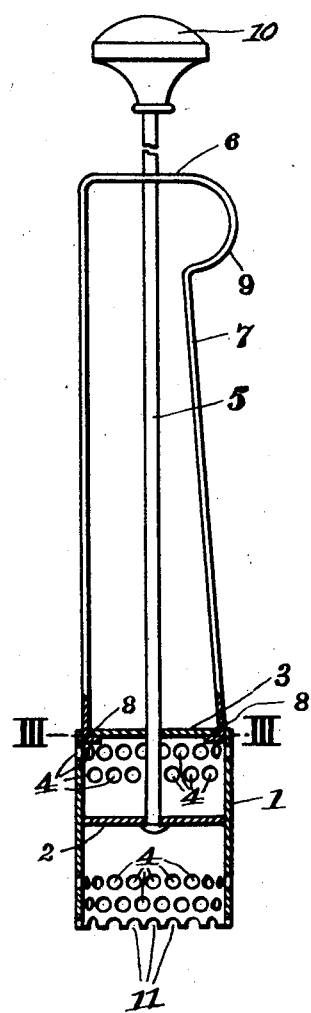
Fig. 2 is a vertical section of the piston and casing of the device.
Figure 3:
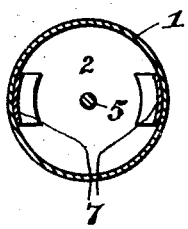
Fig. 3 is a transverse section of said casing taken on the line III—III of Fig. 2.

The casing 1 of the device, in which the piston 2 works, is tubular in form and preferably circular in cross section. It is open at the bottom, as shown in Fig. 2, and closed at the top, as at 3. The central portion of the walls of the casing is imperforate but there are two circular series of openings 4 near each end of said casing extending around said walls.

The piston 2 is attached to a rod 5 extending up through the closed upper end 3 of the casing and also guided in an upper looped portion 6 of a handle strip 7 having its extremities secured to said top closure 3 as by having the ends of said strip passed through said closure, as at 8, and secured in any suitable manner to the under face thereof. The strip 7 has a bowed portion or offset 9 near its upper end to enable a firmer grip to be had upon said handle strip. The piston rod 5 has a knob or other suitable handle 10 on its upper end and is long enough to permit the piston to be displaced from the open bottom end of the casing to facilitate cleaning of the parts.

In use, the casing containing the piston is inserted into a container for the eggs or cream to be whipped or beaten, and while the casing is held by one hand of the operator grasping the looped strip 7, preferably at the offset 9, the piston is reciprocated in said casing by the other hand grasping the knob or handle 10 on the upper end of the piston rod. The reciprocating movement of the piston in the imperforate middle portion of the casing creates a suction and a blowing action alternately at one end and then at the other of the said casing, thereby drawing into said casing through the openings 4 some of the material to be whipped and forcing the same out again. In this way the material is quickly beaten up or whipped into a very light and fluffy condition.

The lower edge of the casing is preferably notched at 11 to permit the material to be drawn into said casing from the bottom of the container or bowl (not shown) in which it is beaten or whipped, as well as from points higher up in said container or bowl. These bottom notches 11 are especially useful where a small quantity of material, for instance one egg, is to be beaten or whipped, and said material does not reach up very far around the casing of the beater.

Having thus described my invention, what I claim as new and desire to secure by Letters Patent of the United States is:—

An agitating device of the class described, comprising a cylinder, an agitator operating in said cylinder and having an operating rod projecting upwardly therefrom, a guide member for said rod having parallel side arms engaging said cylinder at their lower ends and having a transverse upper connecting member perforated to guide said rod, the upper portion of one of said side arms being off-set to provide a hand grip, as described.

In testimony whereof I have signed my name to this specification.

GEORGE D. MUNSING.